US010373405B2

(12) United States Patent
Abuelsaad et al.

(10) Patent No.: US 10,373,405 B2
(45) Date of Patent: Aug. 6, 2019

(54) VEHICLE GENERATED DATA

(71) Applicant: International Business Machines Corporation, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/274,580

(22) Filed: Sep. 23, 2016

(65) Prior Publication Data

US 2018/0089909 A1 Mar. 29, 2018

(51) Int. Cl.

| | |
|---|---|
| ***G07C 5/06*** | (2006.01) |
| ***G07C 5/08*** | (2006.01) |
| ***G07C 5/12*** | (2006.01) |
| ***G01C 22/02*** | (2006.01) |
| ***G07C 5/00*** | (2006.01) |

(52) U.S. Cl.
CPC ............... *G07C 5/06* (2013.01); *G01C 22/02* (2013.01); *G07C 5/008* (2013.01); *G07C 5/085* (2013.01); *G07C 5/12* (2013.01)

(58) Field of Classification Search
CPC .......... C07C 5/06; G01C 22/02; G07C 5/085; G07C 5/12
USPC ........................................................ 701/32.5
See application file for complete search history.

(56) References Cited

U.S. PATENT DOCUMENTS

| | | | |
|---|---|---|---|
| 4,072,850 | A | 2/1978 | McGlynn |
| 7,925,433 | B2 | 4/2011 | Smith et al. |
| 8,131,420 | B2 | 3/2012 | Lynch et al. |
| 8,264,215 | B1 | 9/2012 | Kovach et al. |
| 8,572,009 | B2 | 10/2013 | Harris |
| 9,014,918 | B2 | 4/2015 | Hagen et al. |

(Continued)

FOREIGN PATENT DOCUMENTS

WO 2015197322 A1 12/2015

OTHER PUBLICATIONS

Andre, "Actual car use and operating conditions as emission parameters: derived urban driving cycles", ResearchGate, San Francisco, CA; Article in Science of the Total Environment, May 1994, 3 pages, Elsevier, Accessed Online: Sep. 23, 2016.

(Continued)

*Primary Examiner* — Muhammad Shafi
(74) *Attorney, Agent, or Firm* — Cantor Colburn LLP; Samuel Waldbaum

(57) ABSTRACT

Embodiments are directed to a computer-implemented method of generating data of a vehicle. The method includes tracking, using a processor system, mileage data that represents a number of miles driven by the vehicle. The method further includes storing, using a memory system, the mileage data. The method further includes tracking, using the processor system, operating data that represents how the vehicle has been operated. The method further includes storing, using the memory system, the operating data. The method further includes generating, using the processor system, a map that maps relationships among the mileage data and the operating data.

20 Claims, 9 Drawing Sheets

(56) References Cited

U.S. PATENT DOCUMENTS

| | | | | |
|---|---|---|---|---|
| 2006/0004499 | A1 | 1/2006 | Trego et al. | |
| 2006/0089789 | A1 | 4/2006 | Bishop | |
| 2010/0057511 | A1 | 3/2010 | Mansouri et al. | |
| 2010/0223080 | A1 | 9/2010 | Basir et al. | |
| 2012/0226390 | A1* | 9/2012 | Adams | G07C 5/008 701/1 |
| 2012/0253888 | A1* | 10/2012 | Davidson | G06Q 10/08 705/7.38 |
| 2013/0116996 | A1 | 5/2013 | Callan | |
| 2014/0074345 | A1 | 3/2014 | Gabay et al. | |

OTHER PUBLICATIONS

Ashtari et al.; "PEV Charging Profile Prediction and Analysis Based on Vehicle Usage Data"; IEEE Transactions on Smart Grid, vol. 3, No. 1; Mar. 2012; pp. 341-350.

Disclosed Anonymously, "Detected tire wear based on horizontal force on tire", IPCOM000222478D, IP.com Electronic Publication Date: Oct. 10, 2012, 3 pages, ip.com.

Disclosed Anonymously, "Strategy to Predict Component Life Remaining Against Vehicle Usage", IPCOM000138318D, IP.com Electronic Publication Date: Jul. 17, 2006, 5 pages, ip.com.

Fletcher, "Measuring Hours vs. Miles in Medium-Duty Truck Performance", Work Truck Magazine, Oct. 23, 2013, 10 pages, Sherb Brown VP/Group Publisher—Auto Group, Torrance, CA, Accessed Online: Sep. 19, 2016.

* cited by examiner

| | OWNER 1 WEIGHTED AVERAGE SCORE 50/100 | | | OWNER 2 WEIGHTED AVERAGE SCORE 90/100 | | |
|---|---|---|---|---|---|---|
| | MILE-1 | MILE-2 | MILE-N | MILE-1 | MILE-2 | MILE-N |
| OPERATING PARAMETER A | OPERATING DATA | OPERATING DATA | OPERATING DATA | OPERATING DATA | OPERATING DATA | OPERATING DATA |
| OPERATING PARAMETER B | OPERATING DATA | OPERATING DATA | OPERATING DATA | OPERATING DATA | OPERATING DATA | OPERATING DATA |
| OPERATING PARAMETER C | OPERATING DATA | OPERATING DATA | OPERATING DATA | OPERATING DATA | OPERATING DATA | OPERATING DATA |
| TIME | TIME DATA | TIME DATA | TIME DATA | TIME DATA | TIME DATA | TIME DATA |
| SCORE | 40 | 60 | 50 | 100 | 80 | 90 |

FIG. 6A

| | OWNER 1 WEIGHTED AVERAGE SCORE 50/100 | | | OWNER 2 WEIGHTED AVERAGE SCORE 90/100 | | |
|---|---|---|---|---|---|---|
| | TIME-1 | TIME-2 | TIME-N | TIME-1 | TIME-2 | MILE-N |
| OPERATING PARAMETER A | OPERATING DATA | OPERATING DATA | OPERATING DATA | OPERATING DATA | OPERATING DATA | OPERATING DATA |
| OPERATING PARAMETER B | OPERATING DATA | OPERATING DATA | OPERATING DATA | OPERATING DATA | OPERATING DATA | OPERATING DATA |
| OPERATING PARAMETER C | OPERATING DATA | OPERATING DATA | OPERATING DATA | OPERATING DATA | OPERATING DATA | OPERATING DATA |
| MILE(S) | MILES DATA | MILES DATA | MILES DATA | MILES DATA | MILES DATA | MILES DATA |
| SCORE | 40 | 60 | 50 | 100 | 80 | 90 |

FIG. 6B

VEHICLE GENERATED DATA

BACKGROUND

The present invention relates in general to vehicle usage. More specifically, the present invention relates to methods, systems and computer program products for gathering, storing, analyzing and reporting data on how a vehicle has been driven.

On-board diagnostics (OBD) is a computer-based system that was originally designed to reduce emissions by monitoring the performance of major engine components of an automobile. A basic OBD system includes an electronic control unit (ECU), which uses input from various sensors (e.g., oxygen sensors) to control various vehicle actuators (e.g., fuel injectors) in order to reach the desired performance. A contemporary automobile can support hundreds of sensors that sense hundreds of parameters, which can be accessed via a diagnostic link connector (DLC) using a device called a scan tool. Accordingly, automobiles using OBD systems and sensors have the capability to generate a considerable amount of sensed data about how a vehicle has been operated and driven, although such data is not currently being consistently logged and stored.

SUMMARY

Embodiments are directed to a computer-implemented method of generating data of a vehicle. The method includes tracking, using a processor system, mileage data that represents a number of miles driven by the vehicle. The method further includes storing, using a memory system, the mileage data. The method further includes tracking, using the processor system, operating data that represents how the vehicle has been operated. The method further includes storing, using the memory system, the operating data. The method further includes generating, using the processor system, a map that maps relationships among the mileage data and the operating data.

Embodiments are further directed to a computer system for generating data of a vehicle. The system includes a memory system and a processor system communicatively coupled to the memory system, wherein the processor system and the memory system are configured to perform a method that includes tracking mileage data that represents a number of miles driven by the vehicle. The method performed by the processor system and the memory system further includes storing the mileage data and tracking operating data that represents how the vehicle has been operated. The method performed by the processor system and the memory system further includes storing the operating data and generating a map that maps relationships among the mileage data and the operating data.

Embodiments are further directed to a computer program product for generating data of a vehicle. The computer program product includes a computer readable storage medium having program instructions embodied therewith, wherein the computer readable storage medium is not a transitory signal per se. The program instructions are readable by a processor system to cause the processor system to perform a method that includes tracking mileage data that represents a number of miles driven by the vehicle. The method performed by the processor system further includes storing the mileage data and tracking operating data that represents how the vehicle has been operated. The method performed by the processor system further includes storing the operating data and generating a map that maps relationships among the mileage data and the operating data.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 6A depicts a block diagram that represents a database embodying aspects of the present invention;

FIG. 6B depicts a block diagram that represents a database embodying aspects of the present invention;

Figure 1:
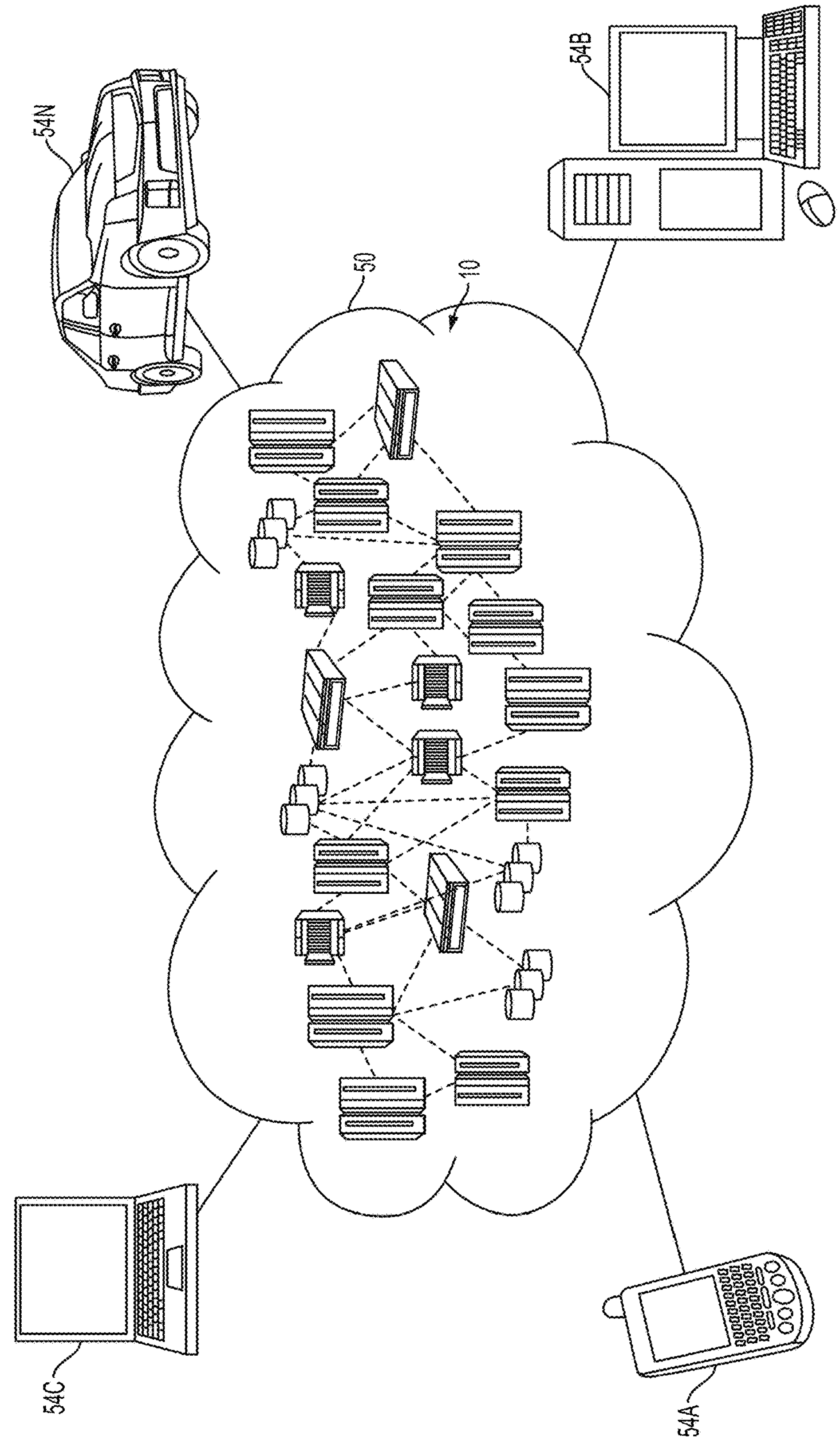
FIG. 1 depicts a cloud computing environment according to one or more embodiments of the present invention.

In the accompanying figures and following detailed description of the disclosed embodiments, the various elements illustrated in the figures are provided with two, three or four digit reference numbers. In most instances, the leftmost digit(s) of each reference number corresponds to the figure in which its element is first illustrated.

DETAILED DESCRIPTION

It is understood in advance that although a detailed description on cloud computing is provided, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
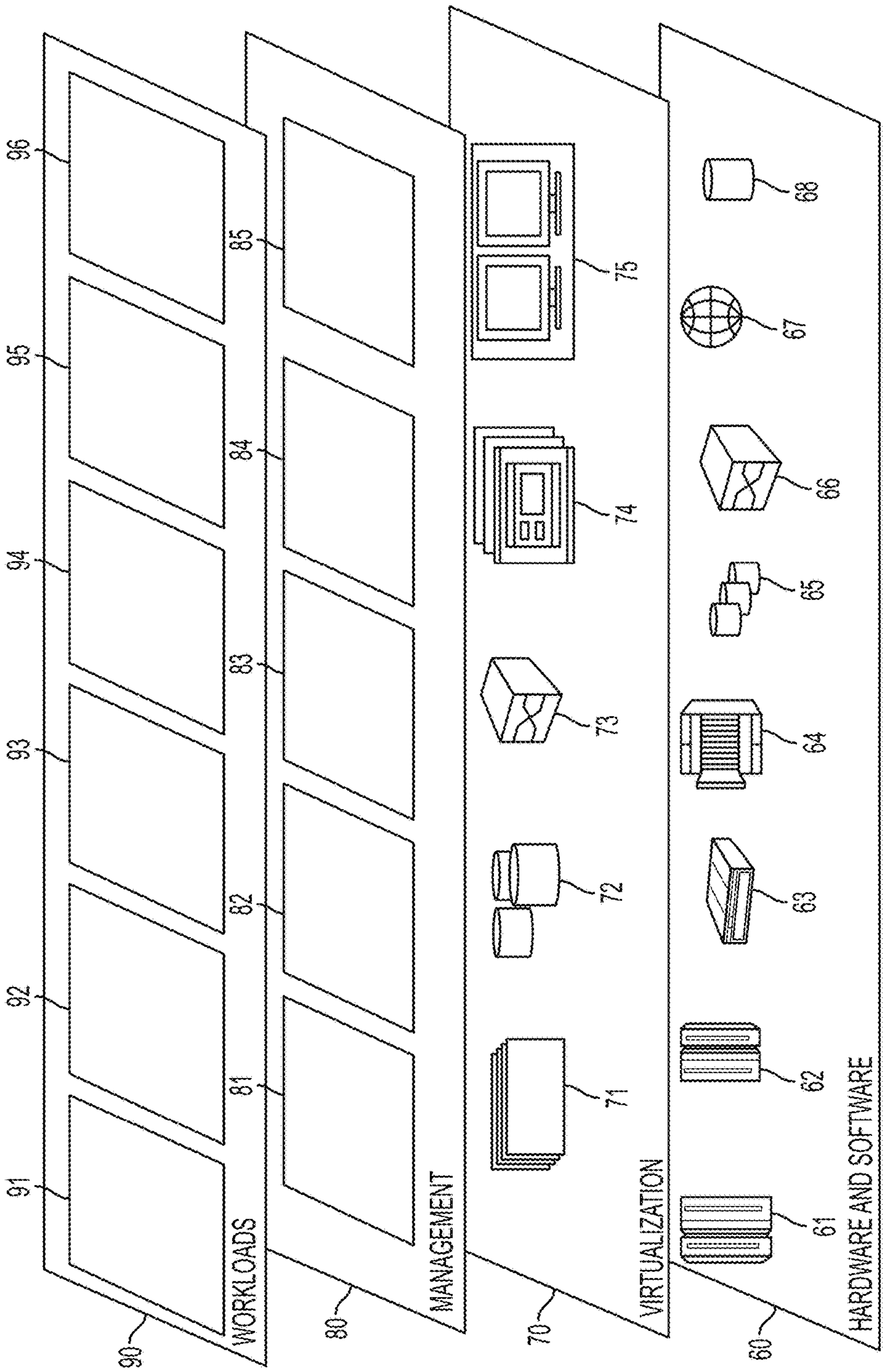
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle data sensing, storage, mapping and analysis 96.

Figure 3:
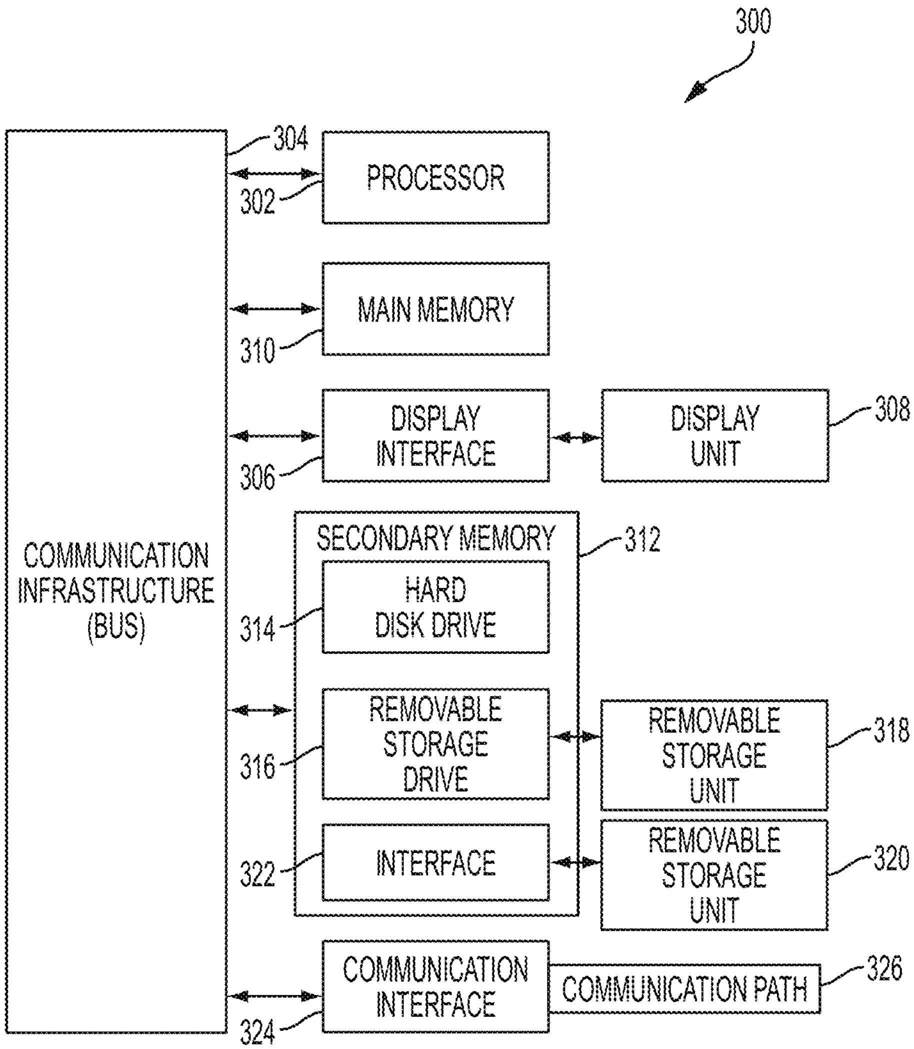
FIG. 3 depicts details of an exemplary computing system capable of implementing one or more aspects of the presents invention.

FIG. 3 depicts a high level block diagram computer system 300, which may be used to implement one or more aspects of the present invention. More specifically, computer system 300 may be used to implement hardware components of embodiments of the present invention. Although one exemplary computer system 300 is shown, computer system 300 includes a communication path 326, which connects computer system 300 to additional systems (not depicted) and may include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In alternative embodiments, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310 and/or secondary memory 312. Computer programs may also be received via communications interface 324. Such computer programs, when run, enable the computer system to perform the features of the present invention as discussed herein. In particular, the computer programs, when run, enable processor 302 to perform the features of the computer system. Accordingly, such computer programs represent controllers of the computer system.

The terms "vehicle," "car," "automobile," and variations thereof may be used interchangeably herein and can refer to a device or structure for transporting animate and/or inanimate or tangible objects (e.g., persons and/or things), such as a self-propelled conveyance. A vehicle as used herein can include any conveyance or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The terms "determine," "calculate," and "compute," and variations thereof, as used herein, are used interchangeably and include any type of methodology, process, mathematical operation, or technique.

The phrases "in communication with" or "communicatively coupled to" and variations thereof may be used interchangeably herein and can refer to any coupling, connection, or interaction using electrical signals to exchange information or data, using any system, hardware, software, protocol, or format, regardless of whether the exchange occurs wirelessly or over a wired connection.

The phrases "communication device," "smartphone," and "mobile device," and variations thereof, as used herein, can be used interchangeably and may include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The phrases "communication system" or "communication network," and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system can refer to the collection individual communication hardware, as well as interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers to some type of wired or wireless communication link that connects various components, such as communication hardware, within a communication system.

Additionally, a communication network may refer to a specific setup of a communication system with the collection of individual communication hardware and interconnects having some definable network topography. A communication network may include wired and/or wireless network having a pre-set to an ad hoc network structure. Some of the basic hardware components that can be used in networks include interface cards, repeaters, hubs, bridges, switches, routers, proxies, and firewalls. Interface cards allow computers to communicate over the network with a low-level addressing system using media access control (MAC) addresses to distinguish one computer from another. Repeaters are electronic devices that amplify communication signals and also filter noise from interfering with the signals. Hubs contain multiple ports, thus allowing a packet of information/data to be copied unmodified and sent to all computers on the network. Bridges connect network segments, which allow information to flow only to specific destinations. Switches are devices that forward, make forwarding decisions and otherwise filter chunks of data communications between ports according to the MAC addresses in the packets of information. Routers are devices that forward packets between networks by processing the information in the packet. Firewalls reject network access requests from unsafe sources, but allow requests for safe ones.

Many of the functional units described in this specification have been labeled as modules. Embodiments of the present invention apply to a wide variety of module implementations. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Various embodiments and aspects of the present invention will now be described with reference to the related drawings. Alternate embodiments may be devised without departing from the scope of this invention. It is noted that various connections are set forth between elements in the following description and in the drawings. These connections, unless specified otherwise, may be direct or indirect, and the present invention is not intended to be limiting in this respect. Accordingly, a coupling of entities may refer to either a direct or an indirect connection.

Turning now to a more specific description of issues that are addressed by one or more embodiments of the present invention, with millions of used cars available to be purchased every day, it is difficult to accurately distinguish vehicles that have been abused from vehicles that have been treated with care. It is a popular default analysis to focus on the total number of miles the car has been driven, under the broad assumption that fewer miles are better.

However, the factors that determine how hard a vehicle has been driven are not widely known by consumers, and are not easily identified by odometer readings or by pre-purchase inspections. For example, during the first 500 miles of a car's life, in order to properly break the car in, highway speeds, hard starts and hard stops should be avoided. A purchaser of a used car has no way to objectively determine whether a car with 28,000 miles on it that is 8 years old was a garage car or a city car that was hot-rodded from light to light.

Turning now to an overview of one or more embodiments of the present invention, a new type of "odometer" is proposed that captures not only the mileage driven but the factors of each time/distance interval that determines how hard the vehicle was driven, based on percentages of the vehicle's stated performance abilities. Embodiments of the present invention take advantage of the vast instrumentation in cars today in order to keep track of the operating data of the vehicle, and map that operating vehicles to the miles driven in order to provide an objective indication of what the miles shown on an odometer really mean.

In one or more embodiments of the present invention, mileage data that represents a number of miles driven by a vehicle is tracked and stored in memory. Operating data that represents how the vehicle has been operated is also tracked and stored in memory. A map is then generated that maps relationships among the mileage data and the operating data. In one or more embodiments, time data is tracked that represents periods of time during which the vehicle was operated, and the time data is stored in memory. In one or more embodiments, the map further maps relationships among the time data, the mileage data and the operating data. In one or more embodiments, the map data is stored in a relational database that tracks the relationships among the operating data, the mileage data, and/or the time data. In one or more embodiments, the map is incorporated into a graphical user interface (GUI) and displayed on a display. In one or more embodiments, the GUI includes an ability to search the map based on at least one search criterion. In one or more embodiments, the GUI includes an ability to sort the map based on at least one sort criterion. In one or more embodiments, the GUI includes an ability to compare the map based on at least one comparison criterion.

Figure 4:
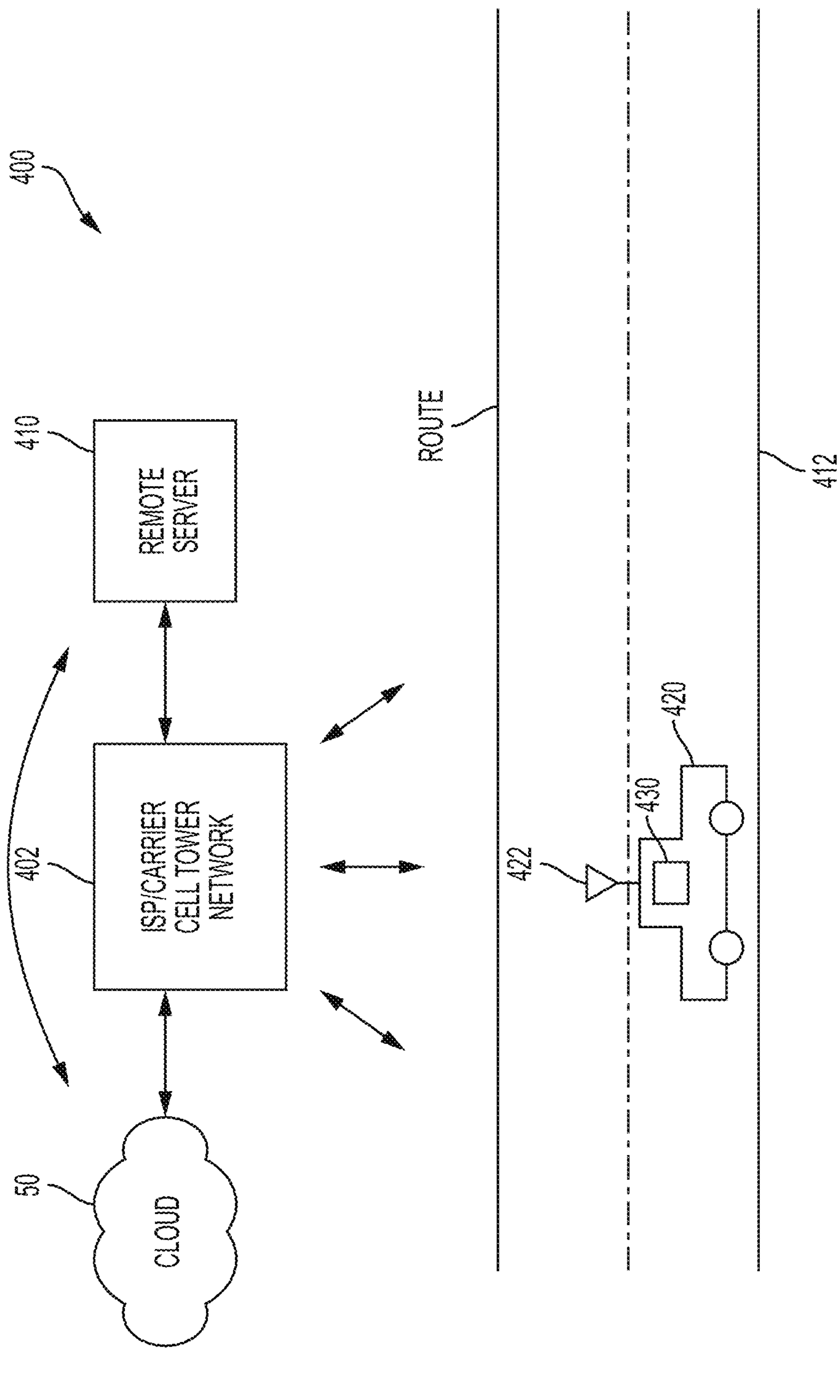
FIG. 4 depicts a block diagram of a system embodying aspects of the present invention.

Turning now to a more detailed description of one or more embodiments of the present invention, FIG. 4 depicts a diagram illustrating a system 400 embodying aspects of the present invention. System 400 includes a vehicle 420 traveling on a route 412, an ISP/carrier cell tower network 402, a remote sever 410 for optionally receiving and analyzing mapped operating/miles/time data, a cloud computing system 50, and an antenna system 422 and a vehicle electronics system 430 of the vehicle 420, configured and arranged as shown. Vehicle electronics system 430 includes sufficient processing power to gather, store, map and analyze operating data, time data and miles data of the vehicle 420 according to embodiments of the present invention. In one or more embodiments, vehicle electronics system 430 gathers, stores and maps operating/time/miles data of the vehicle 420, and then transmits the mapped operating/time/miles data through cell tower network 402 to either cloud computing system 50 or remote server 410 for analysis. In one or more embodiments, vehicle electronics system 430 gathers and stores operating/time/miles data of the vehicle 420, and then transmits the stored operating/time/miles data through cell tower network 402 to either cloud computing system 50 or remote server 410 for mapping and analysis.

Cloud computing system 50 is in wired or wireless electronic communication with one or all of remote server 410, cell tower network 402, antenna system 422, and vehicle electronics system 430. Cloud computing system 50 may supplement, support or replace some or all of the functionality of remote server 410, cell tower network 402, antenna system 422, and vehicle electronics system 430. Additionally, some or all of the functionality of remote server 410, cell tower network 402, antenna system 422, and vehicle electronics system 430 may be implemented as a node 10 (shown in FIG. 1) of cloud computing system 50.

Figure 5:
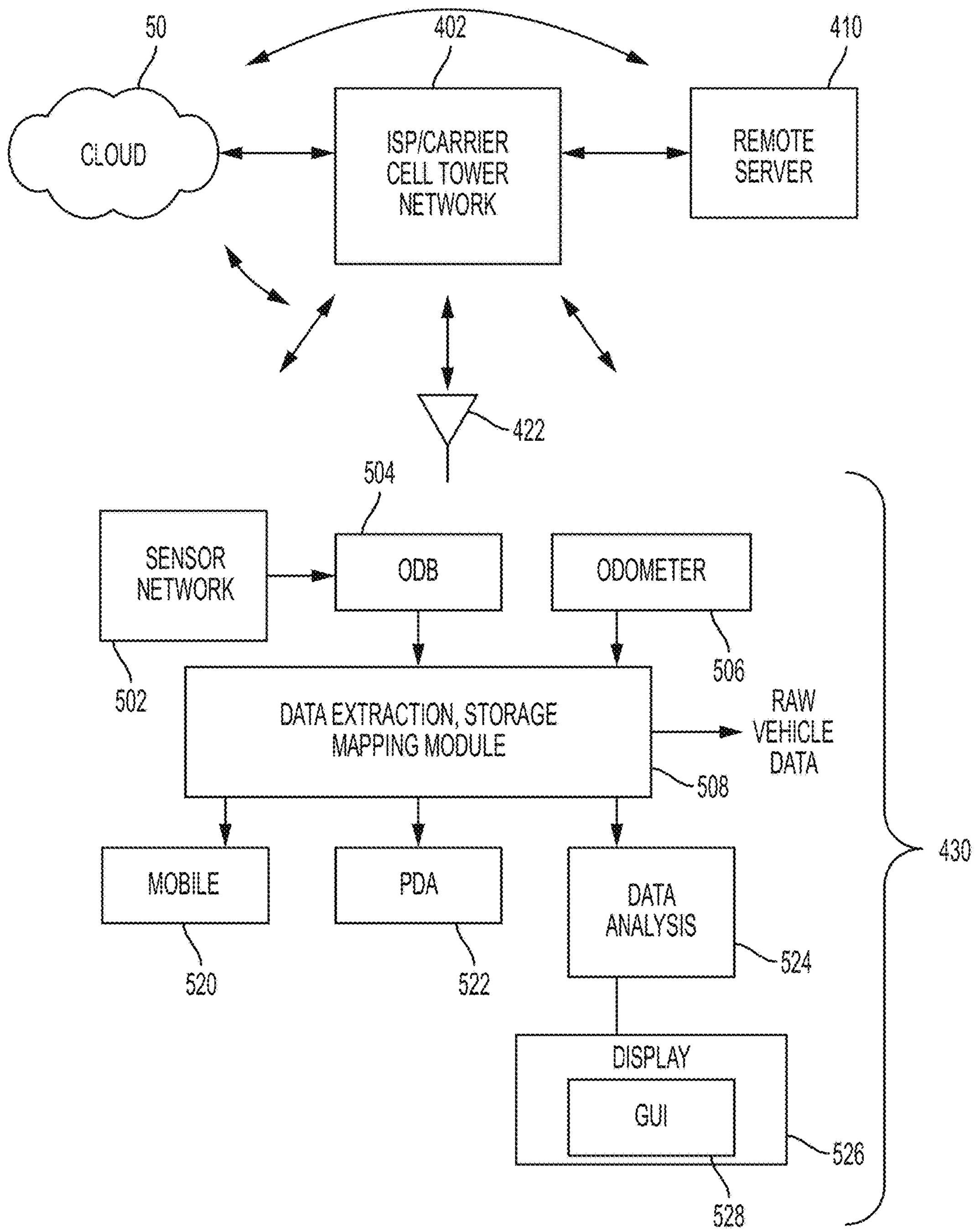
FIG. 5 depicts a block diagram of a system embodying aspects of the present invention.

FIG. 5 depicts a block diagram showing portions of system 400, along with additional details of vehicle electronics system 430 of vehicle 422. Vehicle electronics system 430 includes antenna system 422, a sensor system 502, an OBD system 504, an odometer 506, a data extraction/storage/mapping module 508, a mobile smartphone 520, a personal-digital-assistant (PDA)/tablet 522, a data analysis module 524 and a display 526, configured and arranged as shown. The various modules of vehicle electronics 430 are provided for ease of illustration and explanation, and it is understood that in other embodiments the functions performed by the various components of vehicle electronics 430 can be distributed differently than shown. For example, module 508 could perform only data extraction and storage, and module 524 could perform both mapping and analysis.

Cloud computing system 50 is in wired or wireless electronic communication with one or all of sensor system 502, OBD system 504, odometer 506, data extraction, storage and mapping module 508, mobile smartphone 520, PDA/tablet 522, data analysis module 524 and display 526. Cloud computing system 50 may supplement, support or replace some or all of the functionality of sensor system 502, OBD system 504, odometer 506, data extraction, storage and mapping module 508, mobile smartphone 520, PDA/tablet 522, data analysis module 524 and display 526. Additionally, some or all of the functionality of sensor system 502, OBD system 504, odometer 506, data extraction, storage and mapping module 508, mobile smartphone 520, PDA/tablet 522, data analysis module 524 and display 526 can be implemented as a node 10 (shown in FIG. 1) of cloud computing system 50.

Exemplary operations of vehicle electronics system 430 according to embodiment of the present invention will now be described with reference to elements shown in FIGS. 4 and 5. Module 508 receives (or gathers or extracts), stores and maps operating data, time data and miles data of the vehicle 420 from OBD 506 and odometer 508. Odometer 508 is an instrument that indicates distance traveled by vehicle 420. Odometer 508 can be electronic, mechanical, or a combination of the two. According to embodiments of the present invention, OBD system 506 is a computer-based system that monitors the performance of major engine components of an automobile (e.g., vehicle 420). A basic configuration for OBD system 506 includes an ECU (not shown), which uses input from various sensors (e.g., sensor network 502) to control the actuators (e.g., fuel injectors) of an automobile in order to reach the desired performance. A contemporary OBD system 506 can support hundreds of sensors that sense hundreds of parameters, which can be accessed via a diagnostic link connector (not shown) using a device called a scan tool (not shown). Accordingly, OBD system 506 and sensor network 502 cooperate to generate sensed operating data about how vehicle 420 has been operated and driven, which includes but is not limited to data about the vehicle's route, duration of trips, number of times started/stopped, speed, speed of acceleration, speed of deceleration, use of cruise controls, the wear and tear on its components, and even road conditions and temperatures (engine and external). The sensors that form the sensor network 502 are chosen to provide the data needed to measure selected parameters. For example, throttle positions sensors are provided to measure throttle position. G-analyst sensors are provided to measure g-forces.

According to embodiments of the present invention, module 508 generates a map that maps the various relationships among various combinations of the operating data, the mileage data, and/or the time data. For example, for a single mile driven by vehicle 420, the mapping according to embodiments of the invention would identify the operating data that was gathered during that mile, as well as the time it took vehicle 420 to travel that mile. For a selected range of miles (e.g., the first 500 miles of the vehicle's life) driven by vehicle 420, the mapping would identify the operating data that was gathered during that range of miles, as well as the time it took vehicle 420 to travel that range of miles. For a single unit of time (e.g., 1 minute, 45 minutes, 4 hours) during which the vehicle 420 is operated without being stopped, the mapping would identify the operating data that was gathered during that single unit of time, as well as the miles that were traveled by the vehicle 420 during that unit of time. In one or more embodiments, module 508 stores the operational/time/miles data and the mapping relationship in a relational database that is located in module 508 or in any other storage location of the vehicle electronics system 430. In general, a database is a means of storing information in such a way that information can be retrieved from it. A relational database presents information in tables with rows and columns. A table is referred to as a relation in the sense that it is a collection of objects of the same type (rows). Data in a table can be related according to common keys or concepts, and the ability to retrieve related data from a table is the basis for the term relational database. A database management system (DBMS) handles the way data is stored, maintained, and retrieved. In the case of a relational database, a relational database management system (RDBMS) performs these tasks.

Figure 7:
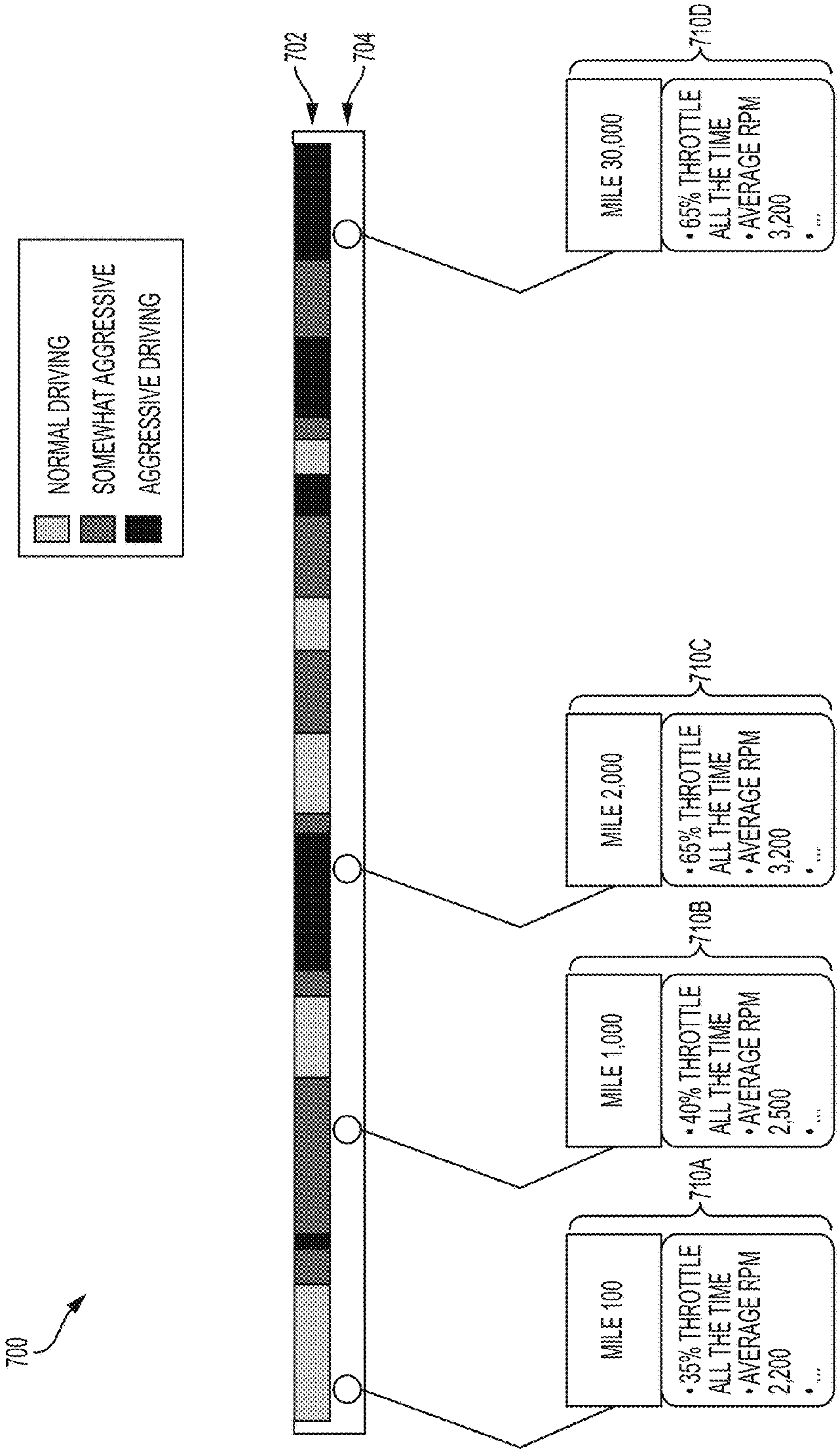
FIG. 7 depicts a diagram illustrating an example format of a vehicle usage report capable of being generated and displayed according to one or more embodiments of the present invention.

Module 508 is communicatively coupled to data analysis module 524 and display 526. Module 508 provides to analysis module 524 the map that maps the various relationships among various combinations of the mileage data, the operating data and time data. Module 524 includes sufficient computational functionality to perform calculations on the operational/miles/time data of the map, and to compare the calculations against performance standards in order to derive conclusions about how the vehicle 420 was operated during each mile, range of miles or unit of time during which the vehicle 420 was operated. Module 524, display 226 and GUI 528 include the ability to search, sort, compare, organize and display against a variety of search, sort and/or comparison criteria the map that maps the various relationships among various combinations of the mileage data, the operating data and time data. Display 526 may be a computer monitor, a liquid crystal display ("LCD")

monitor, or any device capable of displaying data on a screen, paper, or other media. Examples of a suitable GUI format 700 is shown in FIG. 7 and described in more detail later in this detailed description.

In one or more embodiments, module 508 provides to mobile smartphone 520 and/or PDA/tablet 522 the map that maps the various relationships among various combinations of the mileage data, the operating data and time data. Mobile smartphone 520 and/or PDA/tablet 522 include sufficient computational functionality to perform substantially the same functions performed by module 524 and display 526.

In one or more embodiments, the map that maps the various relationships among various combinations of the mileage data, the operating data and time data can be provided as raw data that can be uploaded through antenna system 422 and cell tower network 402 to cloud computing system 50 and/or remote server 410 for analysis. Cloud computing system 50 and remote server 410 each includes sufficient computational functionality to perform substantially the same functions performed by module 524 and display 526. In one or more embodiments, the map that maps the various relationships among various combinations of the mileage data, the operating data and time data can be provided as raw data that can be stored on a portable flash memory (not shown) and transported to a remote computer (not shown) for further processing. The remote computer includes sufficient computational functionality to perform substantially the same functions performed by module 524 and display 526.

FIG. 6A depicts a block diagram of an example table 600A that represents the relationships that can be stored in a relational database according to aspects of the present invention. As shown in table 600A, each mile 1-N is mapped against operating parameters A, B and C, as well as time. For each mile/operating parameter pair, operating data is measured and stored. For each mile/time pair, the corresponding time data is tracked and stored. The operating data measured and stored for each mile/operating parameter can be further processed to derive calculated operating data that can be measured against a standard to determine a score that indicates how the car was driven. The score can be on a scale from zero to 100, with zero to 40 representing aggressive driving, 40-70 representing somewhat aggressive driving, and 70-100 representing normal driving. For the example table 600A, the score for mile-1 is accumulated across operating parameters A, B and C and displayed at the bottom of the column marked Mile-1. A similar score is developed and stored for miles 2 through N. Additionally, the miles may be associated with an owner. As shown at the top of example table 600A, miles 1-N are associated with Owner 1, and miles N+1 to N+M are associated with Owner 2. Additionally a weighted average score (based on the scores for each mile) may be calculated and stored for Owner 1 and Owner 2. Table 600A and the scores shown therein and described above are examples. Other table formats and scores may derived that are based on a mapping of the relationship between miles driven and the operating parameters that represent how the vehicle was during those miles.

FIG. 6B depicts a block diagram of an example table 600B that represents the relationships that can be stored in a relational database embodying aspects of the present invention. Table 600B is substantially identical to Table 600A except the primary mapping is the relationship between time, operating parameters and miles. As shown in table 600B, each time 1-N is mapped against operating parameters A, B and C, as well as miles. For each time/operating parameter pair, operating data is measured and stored. For each time/mile pair, the corresponding miles data is tracked and stored. The operating data measured and stored for each time/operating parameter can be further processed to derive calculated operating data that can be measured against a standard to determine a score that indicates how the car was driven. The score can be on a scale from zero to 100, with zero to 40 representing aggressive driving, 40-70 representing somewhat aggressive driving, and 70-100 representing normal driving. For the example table 600B, the score for time-1 is accumulated across operating parameters A, B and C and displayed at the bottom of the column marked Time-1. A similar score is developed and stored for times 2 through N. Additionally, the times may be associated with an owner. As shown in example table 600B, times 1-N are associated with Owner 1, and times N+1 to N+M are associated with Owner 2. Additionally a weighted average score (based on the scores for each mile) may be calculated and stored for Owner 1 and Owner 2. Table 600B and the scores shown therein and described above are examples. Other table formats and scores may derived that are based on a mapping of the relationship between time during which the vehicle is operated without being stopped and the operating parameters that represent how the vehicle was during that time.

Accordingly, in aspects of the present invention, operating data is logged and/or calculated for miles/time interval as desired. Examples of stored and/or calculated operating data include but are not limited to throttle position as a percentage (0-idle to 100%-on the floor); G-forces (can be calculated by any accelerometer) in acceleration, deceleration, as well as left & right lateral (cornering); RPM (revolutions per minute) of the engine; gear (for both automatic and manual transmissions); for hybrid vehicles, the percentage of time on the engine, and the percentage of time on the motor; and any other useful telemetry data.

FIG. 7 depicts a diagram illustrating an example format (e.g., a heat map style presentation) of a vehicle usage report 700 capable of being generated and displayed according to one or more embodiments of the present invention. The report includes two horizontal bars 702, 704 extending across the report 700. The bottom bar 704 represents the total miles driven by the subject vehicle. The top bar is a color coded bar that maps an analysis of how the subject vehicle was driven to the miles that the subject vehicle was driven. As shown by the legend in the upper right hand corner of FIG. 7, the color black represents aggressive driving, color medium gray represents somewhat aggressive driving, and the color light gray represents normal driving. A user, can point and click on a mile (or click and drag on a range of miles) of interest on the bottom bar 704 and have a pop up window appear that identifies the mile and provides additional user chosen operating data or performance data that has been calculated from operating data. Example windows are shown at 710A, 710B, 710C, 710D.

The standards for determining normal, somewhat aggressive and aggressive driving can be determined in any suitable way. As a simple example, for every mile where condition X or threshold A is measured then log that mile as an "normal/light usage mile." For every mile where condition Y or threshold B is measured then log that mile as a "somewhat-aggressive/normal usage mile." For every mile where condition Z or threshold C is measured then log that mile as an "aggressive/hard usage mile." For example, the above-describe threshold could refer to a throttle position. Throttle position is how far a driver has pushed the gas pedal down and opened up the throttle body/carburetor/fuel injectors to allow a greater fuel/oxygen mix. If the throttle position does not exceed 20%, this can be categorized as normal driving. If the throttle position is between 20% and 50%, this can be categorized as moderate driving. Any throttle position over 50% can be categorized as aggressive driving.

In one or more embodiments, as shown in FIG. 5, the vehicle electronics 430, and specifically module 508 does not translate the measurements into a categorical "normal, moderate, aggressive" usage metric, but stores it in raw form by which the vehicle electronics 430 can measure each instrument mapped to each mile (and/or mapped to each time selected time interval) and report a total driving report for the vehicle 420, allowing one who is more expert to determine the true impact of how each mile was driven on the vehicle 420. A buyer can then provide their own analysis algorithm that analyzes the raw data and provides them with the analysis results.

Figure 8:
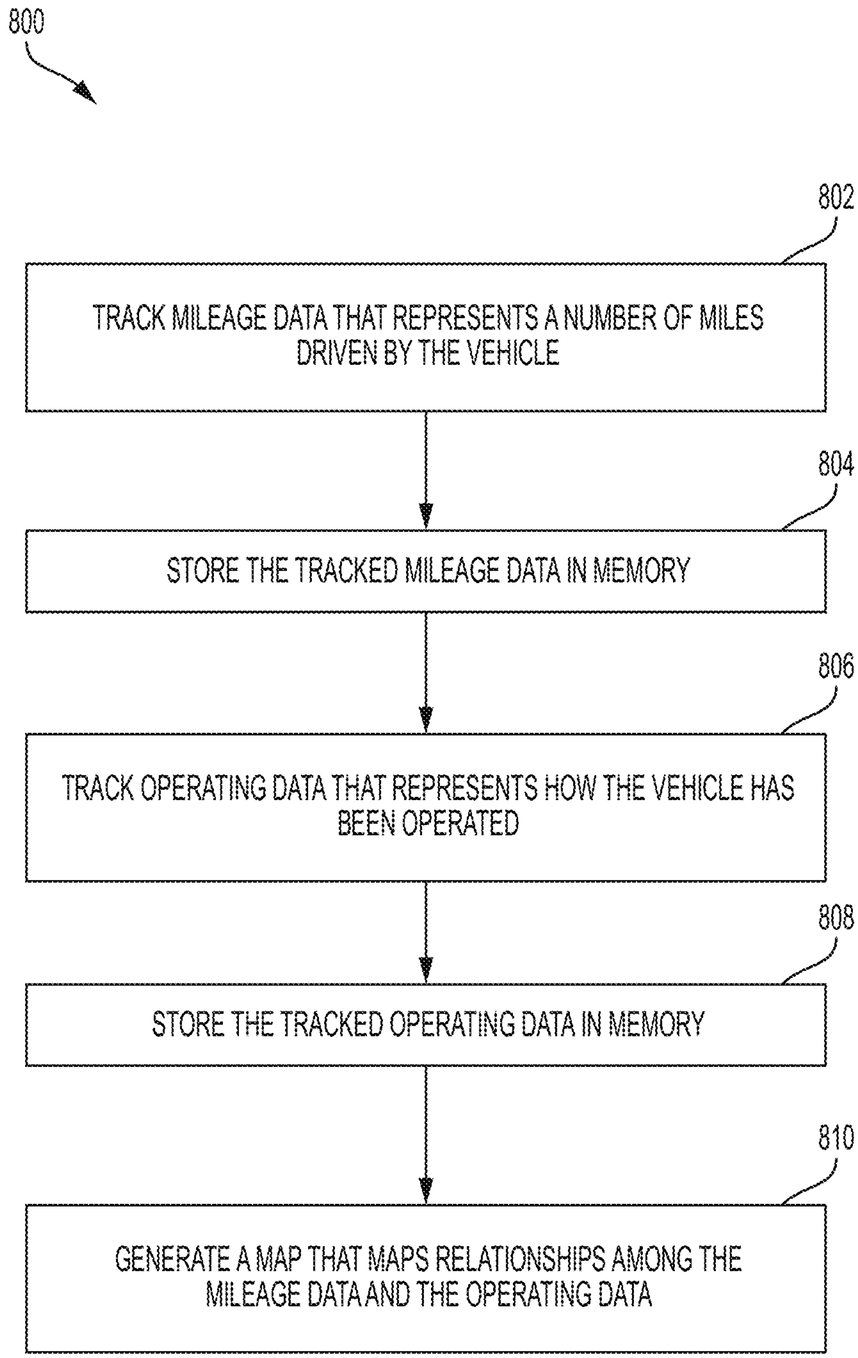
FIG. 8 depicts a flow diagram illustrating a methodology according to one or more embodiments of the present invention.

FIG. 8 depicts a flow diagram illustrating a methodology 800 according to one or more embodiments of the present invention. Methodology 800 begins at block 802 by tracking mileage data that represents a number of miles driven by a vehicle. At block 804, the mileage data is stored in memory. Block 806 tracks operating data that represents how the vehicle has been operated, and block 808 stores the operating data in memory. Block 810 generates a map that maps relationships among the mileage data and the operating data.

In one or more embodiments, time data is tracked that represents periods of time during which the vehicle was operated, and the time data is stored in memory. In one or more embodiments, the map further maps relationships among the time data, the mileage data and the operating data. In one or more embodiments, the map data is stored in a relational database that tracks the relationships among the operating data, the mileage data, and/or the time data. In one or more embodiments, the map is incorporated into a GUI and displayed on a display. In one or more embodiments, the GUI includes an ability to search the map based on at least one search criterion. In one or more embodiments, the GUI includes an ability to sort the map based on at least one sort criterion. In one or more embodiments, the GUI includes an ability to compare the map based on at least one comparison criterion.

Thus it can be seen from the foregoing detailed description that the present invention provides a number of technical benefits. According to the present invention, one or more embodiments provide methods, systems and computer program products for gathering, storing, analyzing and reporting data on how a vehicle has been driven. Embodiments of the invention provide a novel type of odometer that, rather than only logging mileage, also logs information from various sensors that are related to how hard the vehicle was driven. The output is a time series analysis that shows how each mile traveled by the vehicle was driven throughout its lifetime. The novel odometer captures for each mile driven operational data that is of value in determining how hard a vehicle was driven during that mile.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of determining wear on a pre-owned vehicle, the computer-implemented method comprising:

tracking, using a processor system, first mileage data that represents a first number of miles driven by the vehicle during a first time period when the vehicle is owned by a first owner;

storing, using a memory system, the first mileage data;

tracking, using the processor system, a first set of operating data that represents a first operating parameter, wherein the first operating parameter is selected to represent a first measure of wear on the vehicle as a result of the vehicle generating the first set of operating data;

tracking, using the processor system, a second set of operating data that represents a second operating parameter, wherein the second operating parameter is selected to represent a second measure of wear on the vehicle as a result of the vehicle generating the second set of operating data;

storing, using the memory system, the first set of operating data, the second set of operating data, the first operating parameter, and the second operating parameter;

tracking, using the processor system, first ownership data that represents a first owner of the vehicle during the time the first number of miles was driven by the vehicle;

storing, using the memory, the first ownership data;

generating in real time, using the processor system, a map that maps, for each of the first number of miles driven by the vehicle, relationships among the first set of operating data, the second set of operating data, and the first ownership data;

analyzing, using the processor system, the map and known performance standards to determine, for the first number of miles driven by the vehicle during the first time period when the vehicle is owned by the first owner, a text description or a diagram illustration configured to communicate how the vehicle was driven.

2. The computer-implemented method of claim 1 further comprising:

tracking, using the processor system, time data that represents periods of time during which the vehicle was operated; and storing, using the memory system, the time data.

3. The computer-implemented method of claim 2, wherein the map further maps, for each of the number of miles driven by the vehicle, relationships among the time data, the first set of operating data, the second set of operating data, and the first ownership data.

4. The computer-implemented method of claim 1 further comprising:

tracking, using the processor system, second mileage data that represents a second number of miles driven by the vehicle during a second time period when the vehicle is owned by a second owner;

storing, using a memory system, the second mileage data;

tracking, using the processor system, a third set of operating data that represents a third operating parameter, wherein the third operating parameter is selected to represent a third measure of wear on the vehicle as a result of the vehicle generating the third set of operating data;

tracking, using the processor system, a fourth set of operating data that represents a fourth operating parameter, wherein the fourth operating parameter is selected to represent a fourth measure of wear on the vehicle as a result of the vehicle generating the fourth set of operating data;

storing, using the memory system, the third set of operating data, the fourth set of operating data, the third operating parameter, and the fourth operating parameter;

tracking, using the processor system, second ownership data that represents the second owner of the vehicle during the time the second number of miles was driven by the vehicle;

storing, using the memory, the second ownership data;

generating in real time, using the processor system, the map to map, for each of the second number of miles driven by the vehicle, relationships among the third set of operating data, the fourth set of operating data, and the second ownership data; and analyzing, using the processor system, the map and known performance standards to determine, for the second number of miles driven by the vehicle during the second time period when the vehicle is owned by the second owner, another text description or another diagram illustration configured to communicate how the vehicle was driven.

5. The computer-implemented method of claim 1 further comprising storing the map in a relational database.

6. The computer-implemented method of claim 1 further comprising:

incorporating the map into a graphical user interface (GUI); and displaying the GUI on a display;

wherein the GUI comprises an ability to search the map based on at least one search criterion.

7. The computer-implemented method of claim 6, wherein the GUI comprises an ability to:

sort the map based on at least one sort criterion; and compare the map based on at least one comparison criterion.

8. The computer-implemented method of claim 1, wherein analyzing the map and the known performance standards further comprises:

selecting from the map a portion of the first set of operating data that corresponds in the map to a selected portion of the first mileage data and the first owner; and determining, based on comparing the portion of the first set of operating data to the known performance standards for first set of operating data, a level of wear on the vehicle as a result of the vehicle generating the portion of the first set of operating data;

wherein the text description or the diagram illustration configured to communicate how the vehicle was driven is based on the level of wear on the vehicle as a result of the vehicle generating the portion of the first set of operating data.

9. A computer system for tracking wear on a pre-owned vehicle, the system comprising:

a memory system; and a processor system communicatively coupled to the memory system, wherein the processor system and the memory system are configured to:

track first mileage data that represents a first number of miles driven by the vehicle during a first time period when the vehicle is owned by a first owner;

store the first mileage data;

track a first set of operating data that represents a first operating parameter, wherein the first operating parameter is selected to represent a first measure of wear on the vehicle as a result of the vehicle generating the first set of operating data;

track a second set of operating data that represents a second operating parameter, wherein the second operating parameter is selected to represent a second measure of wear on the vehicle as a result of the vehicle generating the second set of operating data;

store the first set of operating data, the second set of operating data, the first operating parameter, and the second operating parameter;

track first ownership data that represents the first owner of the vehicle during the time the first number of miles was driven by the vehicle;

store the first ownership data;

generate in real time a map that maps, for each of the first number of miles driven by the vehicle, relationships among the first set of operating data, the second set of operating data, and the first ownership data;

analyzing, using the processor system, the map and known performance standards to determine, for the first number of miles driven by the vehicle during the first time period when the vehicle is owned by the first owner, a text description or a diagram illustration configured to communicate how the vehicle was driven.

10. The computer system of claim 9, wherein the processor system and the memory system are further configured to:

track time data that represents periods of time during which the vehicle was operated; and store the time data.

11. The computer system of claim 10, wherein the map further maps, for each of the number of miles driven by the vehicle, relationships among the time data, the first set of operating data, the second set of operating data, and the first ownership data.

12. The computer system of claim 9, wherein the processor system and the memory system are further configured to:

track second mileage data that represents a second number of miles driven by the vehicle during a second time period when the vehicle is owned by a second owner;

store the second mileage data;

track a third set of operating data that represents a third operating parameter, wherein the third operating parameter is selected to represent a third measure of wear on the vehicle as a result of the vehicle generating the third set of operating data;

track a fourth set of operating data that represents a fourth operating parameter, wherein the fourth operating parameter is selected to represent a fourth measure of wear on the vehicle as a result of the vehicle generating the fourth set of operating data;

store the third set of operating data, the fourth set of operating data, the third operating parameter, and the fourth operating parameter;

track second ownership data that represents the second owner of the vehicle during the time the second number of miles was driven by the vehicle;

store the second ownership data;

generate in real time the map to map, for each of the second number of miles driven by the vehicle, relationships among the third set of operating data, the fourth set of operating data, and the second ownership data; and analyzing, using the processor system, the map and known performance standards to determine, for the second number of miles driven by the vehicle during the second time period when the vehicle is owned by the second owner, another text description or another diagram illustration configured to communicate how the vehicle was driven.

13. The computer system of claim 9, wherein the processor system and the memory system are further configured to store the map in a relational database.

14. The computer system of claim 9, wherein the processor system and the memory system are further configured to:

incorporate the map into a graphical user interface (GUI); and display the GUI on a display;

wherein the GUI comprises an ability to search the map based on at least one search criterion.

15. The computer system of claim 14, wherein the GUI comprises an ability to:

sort the map based on at least one sort criterion; and compare the map based on at least one comparison criterion.

16. The computer system of claim 15, wherein analyzing the map and the known performance standards further comprises:

selecting from the map a portion of the first set of operating data that corresponds in the map to a selected portion of the first mileage data and the first owner; and determine, based on comparing the portion of the first set of operating data to performance standards for first set of operating data, a level of wear on the vehicle as a result of the vehicle generating the portion of the first set of operating data;

wherein the text description or the diagram illustration configured to communicate how the vehicle was driven is based on the level of wear on the vehicle as a result of the vehicle generating the portion of the first set of operating data.

17. A computer program product for tracking wear on a pre-owned vehicle, the computer program product comprising:

a computer readable storage medium having program instructions embodied therewith, wherein the computer readable storage medium is not a transitory signal per se, the program instructions readable by a processor system to cause the processor system to perform a method comprising:

tracking first mileage data that represents a first number of miles driven by the vehicle during a first time period when the vehicle is owned by a first owner;

storing the first mileage data;

tracking a first set of operating data that represents a first operating parameter, wherein the first operating parameter is selected to represent a first measure of wear on the vehicle as a result of the vehicle generating the first set of operating data;

tracking a second set of operating data that represents a second operating parameter, wherein the second operating parameter is selected to represent a second measure of wear on the vehicle as a result of the vehicle generating the second set of operating data;

storing the first set of operating data, the second set of operating data, the first operating parameter, and the second operating parameter;

tracking first ownership data that represents the first owner of the vehicle during the time the first number of miles was driven by the vehicle;

storing the first ownership data;

generating in real time a map that maps, for each of the first number of miles driven by the vehicle, relationships among the first set of operating data, the second set of operating data, and the first ownership data; and analyzing, using the processor system, the map and known performance standards to determine, for the second number of miles driven by the vehicle during the second time period when the vehicle is owned by the second owner, another text description or another diagram illustration configured to communicate how the vehicle was driven.

18. The computer program product of claim 17 further comprising:

tracking time data that represents periods of time during which the vehicle was operated; and storing the time data;

wherein the map further maps, for each of the number of miles driven by the vehicle, relationships among the time data, the first set of operating data, the second set of operating data, and the first ownership data.

19. The computer program product of claim 17 further comprising:

tracking second mileage data that represents a second number of miles driven by the vehicle during a second time period when the vehicle is owned by a second owner;

storing the second mileage data;

tracking a third set of operating data that represents a third operating parameter, wherein the third operating parameter is selected to represent a third measure of wear on the vehicle as a result of the vehicle generating the third set of operating data;

tracking a fourth set of operating data that represents a fourth operating parameter, wherein the fourth operating parameter is selected to represent a fourth measure of wear on the vehicle as a result of the vehicle generating the fourth set of operating data;

storing the third set of operating data, the fourth set of operating data, the third operating parameter, and the fourth operating parameter;

tracking second ownership data that represents the second owner of the vehicle during the time the second number of miles was driven by the vehicle;

storing the second ownership data;

generating in real time the map that maps, for each of the second number of miles driven by the vehicle, relationships among the third set of operating data, the fourth set of operating data, and the second ownership data; and analyzing, using the processor system, the map and known performance standards to determine, for the second number of miles driven by the vehicle during the second time period when the vehicle is owned by the second owner, another text description or another diagram illustration configured to communicate how the vehicle was driven.

20. The computer program product of claim 17 further comprising:

storing the map in a relational database;

incorporating the map into a graphical user interface (GUI); and displaying the GUI on a display;

wherein the GUI comprises an ability to search the map based on at least one search criterion;

wherein the GUI comprises an ability to sort the map based on at least one sort criterion;

wherein the GUI comprises an ability to compare the map based on at least one comparison criterion.

* * * * *